US007530395B2

(12) United States Patent
Reddy et al.

(10) Patent No.: US 7,530,395 B2
(45) **Date of Patent: *May 12, 2009**

(54) METHODS OF USING WELLBORE SERVICING COMPOSITIONS

(75) Inventors: B. Raghava Reddy, Duncan, OK (US); Rickey Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/691,394

(22) Filed: Mar. 26, 2007

(65) Prior Publication Data

US 2008/0236826 A1 Oct. 2, 2008

(51) Int. Cl.
*E21B 33/138* (2006.01)
*C04B 7/32* (2006.01)

(52) U.S. Cl. ....................................... 166/293; 166/300

(58) Field of Classification Search ....................... None
See application file for complete search history.

(56) References Cited

U.S. PATENT DOCUMENTS

| | | | |
|---|---|---|---|
| 3,426,104 | A | 2/1969 | Masson |
| 4,500,357 | A | 2/1985 | Brothers et al. |
| 4,515,635 | A | 5/1985 | Rao et al. |
| 4,555,269 | A | 11/1985 | Rao et al. |
| 4,557,763 | A | 12/1985 | George et al. |
| 5,346,012 | A | 9/1994 | Heathman et al. |
| 5,488,991 | A | 2/1996 | Cowan et al. |
| 5,547,612 | A | 8/1996 | Austin et al. |
| 5,588,488 | A | 12/1996 | Vijn et al. |
| 5,672,203 | A | 9/1997 | Chatterji et al. |
| 5,698,512 | A | 12/1997 | Austin et al. |
| 5,749,418 | A | 5/1998 | Mehta et al. |
| 5,866,517 | A | 2/1999 | Carpenter et al. |
| 5,871,577 | A | 2/1999 | Chatterji et al. |
| 5,900,053 | A | 5/1999 | Brothers et al. |
| 5,913,364 | A | 6/1999 | Sweatman |
| 5,968,255 | A | 10/1999 | Mehta et al. |
| 5,972,103 | A | 10/1999 | Mehta et al. |
| 6,143,069 | A | 11/2000 | Brothers et al. |
| 6,167,967 | B1 | 1/2001 | Sweatman |
| 6,244,343 | B1 | 6/2001 | Brothers et al. |
| 6,258,757 | B1 | 7/2001 | Sweatman et al. |
| 6,268,406 | B1 | 7/2001 | Chatterji et al. |
| 6,332,921 | B1 | 12/2001 | Brothers et al. |
| 6,457,524 | B1 | 10/2002 | Roddy et al. |
| 6,488,763 | B2 | 12/2002 | Brothers et al. |
| 6,497,283 | B1 | 12/2002 | Eoff et al. |
| 6,715,552 | B2 | 4/2004 | Eoff et al. |
| 6,743,288 | B2 | 6/2004 | Eoff et al. |
| 6,796,378 | B2 | 9/2004 | Reddy et al. |
| 6,822,061 | B2 | 11/2004 | Eoff et al. |
| 6,835,243 | B2 | 12/2004 | Brothers et al. |
| 6,846,357 | B2 | 1/2005 | Reddy et al. |
| 6,855,201 | B2 | 2/2005 | Eoff et al. |
| 6,904,971 | B2 | 6/2005 | Brothers et al. |
| 6,957,702 | B2 | 10/2005 | Brothers et al. |
| 6,962,201 | B2 | 11/2005 | Brothers |
| 6,995,105 | B1 | 2/2006 | Wache et al. |
| 7,021,380 | B2 | 4/2006 | Caveny et al. |
| 7,063,153 | B2 | 6/2006 | Eoff et al. |
| 7,087,189 | B2 | 8/2006 | Austin et al. |
| 7,111,684 | B2 | 9/2006 | Brothers et al. |
| 7,147,055 | B2 | 12/2006 | Brothers et al. |
| 2005/0034864 | A1 | 2/2005 | Caveny et al. |
| 2005/0178295 | A1 | 8/2005 | Caveny et al. |
| 2006/0289163 | A1 | 12/2006 | Lecolier et al. |

FOREIGN PATENT DOCUMENTS

| | | | |
|---|---|---|---|
| EP | 1052232 | A1 | 11/2000 |
| WO | 2006040513 | A1 | 4/2006 |

OTHER PUBLICATIONS

Office Action dated Feb. 13, 2008 (11 pages), U.S. Appl. No. 11/691,395, filed Mar. 26, 2007.

Sugama T.; "Hydrothermal light-weight calcium phosphate cements: Use of polyacrylnitrile-shelled hollow microspheres," Journal of Materials Science, vol. 32, Chapman & Hall, 1997, pp. 3523-3534.

(Continued)

*Primary Examiner*—Zakiya W. Bates
(74) *Attorney, Agent, or Firm*—Craig W. Roddy; Conley Rose, P.C.

(57) ABSTRACT

A method of servicing a wellbore comprising placing in the wellbore a composition comprising a calcium aluminate cement and at least one gelation inhibitor, and allowing the composition to set. A method of servicing a wellbore comprising adjusting the thickening time of calcium aluminate cement by contacting the cement with a salt and a gelation inhibitor, wherein the gelation inhibitor comprises a copolymer comprising one or more sulfonated aromatic monomers and one or more acrylate monomers, placing the cement in the wellbore, and allowing the cement to set. A method of servicing a wellbore comprising preventing premature gelation of calcium aluminate cement by contacting the calcium aluminate cement with a gelation inhibitor comprising a copolymer, wherein the copolymer comprises alkylbenzene sulfonic acid, at least one methallyl sulfonic acid monomer, at least one copolymerizable nonionic monomer, and at least one copolymerizable olefinically unsaturated carboxylic acid monomer, placing the cement in the wellbore, and allowing the cement to set.

29 Claims, No Drawings

OTHER PUBLICATIONS

Sugama T.; "Calcium aluminate cements in fly ash/calcium aluminate blend phosphate cement systems: Their role in inhibiting carbonation and acid corrosion at a low hydrothermal temperature of 90° C," Journal of Materials Science, vol. 37, Kluwer Academic Publishers, 2002, pp. 3163-3173.

Fe-2 "Iron Sequestering Agent" Halliburton Communications dated 1998 (HO1304).

HR-25 "Cement Retarder" Halliburton Communications dated May 2006 (HO1479).

ThermaLock Cement "For Corrosive Co2 Environments" Halliburton Communications date Apr. 2006 (HO1458).

U.S. Appl. No. 11/691,395, filed Mar. 26, 2007.

Office Action (Final) dated Jun. 16, 2008 (5 pages), U.S. Appl. No. 11/691,395, filed Mar. 26, 2007.

Foreign communication from a related counterpart application—International Search Report and Written Opinion, PCT/GB2008/000936, Jul. 8, 2008, 15 pages.

Notice of Allowance dated Oct. 16, 2008 (7 pages), U.S. Appl. No. 11/691,395, filed Mar. 26, 2007.

METHODS OF USING WELLBORE SERVICING COMPOSITIONS

CROSS-REFERENCE TO RELATED APPLICATIONS

The subject matter of the present application is related to U.S. patent application Ser. No. 11/691,395 filed on Mar. 26, 2007 and entitled "Wellbore Servicing Compositions" and U.S. patent application Ser. No. 11/669,060, filed Jan. 30, 2007 and entitled "Wellbore Servicing Compositions and Methods of Using Same," each of which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

This disclosure relates to servicing a wellbore. More specifically, it relates to servicing a wellbore with sealant compositions comprising a calcium aluminate cement and a gelation inhibitor and methods of using same.

2.Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Wellbore servicing fluids are often modified to allow them to function for their intended purpose under extreme conditions (e.g., high temperatures, acidic environment). For example, when cementing high temperature wells, such as steam injection wells or steam production wells, calcium aluminate cements (CACs) are typically used. In such wells, the higher temperature resistance of CACs compared to Portland cement/silica mixtures is an advantage for long term integrity of the cement sheath. The use of CACs offers many advantages as they provide in addition to high temperature resistance, low temperature resistance, sulfate resistance, corrosion resistance and sour gas resistance. Additional examples of wellbore servicing that typically employ CACs include geothermal wells or carbon dioxide injection wells. At high static subterranean temperatures, and in the presence of brines containing carbon dioxide, conventional hydraulic cements rapidly deteriorate due to alkali carbonation and the use of conventional hydraulic cement compositions in these types of wells may result in the loss of wellbore integrity.

CACs combined with a soluble phosphate salt, for example sodium metaphosphate and a filler such as Class F flyash, form quick setting cement that upon setting binds well to the subterranean formation and to itself and has desirable mechanical properties such as high strength, carbonation resistance and low permeability. These compositions are described in Journal of Material Science, 32, 3523-3534

(1997) and J. Material Science, 37, 3163-3173 by Sugama et al, and in U.S. Pat. Nos. 5,900,053, 6,143,069 and 6,332,921 issued to the assignee of the current invention, each of which is incorporated by reference herein in its entirety.

A variety of CACs are commercially available with alumina contents that can range from about 40% to about 80% by weight of the composition. Additionally, these CACs may have iron oxide present in amounts of 18% or higher by weight of the composition. While attractive from an economic standpoint, a significant drawback to the use of low alumina and/or high iron oxide CACs is their tendency to prematurely gel. Furthermore, premature gelation may be exacerbated by other components commonly used in cement slurries and/or may vary depending on the source of the components. As such, premature gelation of cementitious slurries comprising a low alumina and/or high iron oxide CAC along with unpredictable thickening times make well cementing with these types of CACs a challenge. A need therefore exists for materials that prevent the premature gelation of CACs having a low alumina and/or high iron oxide content.

SUMMARY

Disclosed herein is a method of servicing a wellbore comprising placing in the wellbore a composition comprising a calcium aluminate cement and at least one gelation inhibitor, and allowing the composition to set.

Also disclosed herein is a method of servicing a wellbore comprising adjusting the thickening time of calcium aluminate cement by contacting the cement with a salt and a gelation inhibitor, wherein the gelation inhibitor comprises a copolymer comprising one or more sulfonated aromatic monomers and one or more acrylate monomers, placing the cement in the wellbore, and allowing the cement to set.

Further disclosed herein is a method of servicing a wellbore comprising preventing premature gelation of calcium aluminate cement by contacting the calcium aluminate cement with a gelation inhibitor comprising a copolymer, wherein the copolymer comprises alkylbenzene sulfonic acid, at least one methallyl sulfonic acid monomer, at least one copolymerizable nonionic monomer, and at least one copolymerizable olefinically unsaturated carboxylic acid monomer, placing the cement in the wellbore, and allowing the cement to set.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

Disclosed herein are wellbore servicing compositions comprising a calcium aluminate cement (CAC), a polyphosphate salt and a gelation inhibitor (GI) and methods of using same. The CACs may have a low alumina content and/or a high iron oxide content as will be described in more detail later herein. The wellbore servicing compositions comprising a calcium aluminate cement, a polyphosphate salt and a gelation inhibitor of the type described herein may avoid premature gelation and display a predictable thickening time. The wellbore servicing composition may further comprise set modifying agents that also function to adjust the thickening time of the composition as will be described in more detail later herein. Such wellbore servicing compositions may be placed down a wellbore to service same.

In an embodiment, the wellbore servicing composition comprises calcium aluminate cement (CAC), which further comprises calcium, aluminum, and oxygen, and sets and hardens by reaction with water. In an embodiment, the wellbore servicing composition comprises a CAC which when mixed in an aqueous fluid may have a pH in the range of from about 3 to about 10. The amount of CAC in the wellbore servicing composition may range from about 25 wt. % to about 99 wt. %, alternatively from about 30 wt. % to about 80 wt. % or alternatively from about 40 wt. % to about 60 wt. %, based upon the total weight of the solid composition. Additionally, the aluminum oxide to calcium oxide ($Al_2O_3$/CaO) weight ratio may vary from about 0.5:1 to about 5:1, alternately about 1:1 to about 4:1. Examples of suitable CAC materials include without limitation SECAR 80, SECAR 60, SECAR 51, SECAR 41 and SECAR 71 which are calcium aluminate hydraulic cements commercially available from Lafarge Aluminates, Cheasapeake, Va.; CA-14, CA-270, and CA-25 grade calcium aluminate cements commercially available from Almatis, Inc., Leetsdale, Pa.; and THERMALOCK cement which is a blend of calcium aluminate cement comprising calcium aluminate, a phosphate salt and flyash commercially available from Halliburton Energy Services.

In an embodiment, the CAC may have a low alumina content and/or a high iron oxide content. Such cements may further comprise small amounts of silica. Herein a low alumina content CAC refers to a cement having equal to or less than about 50%, alternatively equal to or less than about 40%, or alternatively equal to or less than about 37% alumina by weight of the total CAC. Herein a high iron oxide content CAC refers to a cement having equal to or greater than about 2% Fe as iron oxide, alternatively about 10%, or alternatively about 20% iron oxide ($Fe_2O_3$) by weight of the total CAC. When silica is present, its amounts may range from about 0.1 to about 10% by weight of calcium aluminate. Examples of CACs having low alumina content and/or high iron content include without limitation SECAR 41 and CIMENT FONDU which are calcium aluminate hydraulic cements commercially available from Lafarge Aluminates, Cheasapeake, Va.

In an embodiment, the wellbore servicing composition further comprises a polymeric phosphate salt, for example a polyphosphate salt. The polymeric phosphate salts are generally represented as $(NaPO_3)_n$, where n represents the degree of polymerization of the phosphate unit. The degree of polymerization may range from about 3 to about 30, alternatively from about 10 to about 25. The polyphosphate salts may comprise polymeric phosphate salts of alkali metal salts such as for example and without limitation sodium(hexa)metaphosphate and sodium tripolyphosphate. The amount of polyphosphate salt in the wellbore servicing composition may range from about 2 wt. % to about 20 wt. %, alternatively from about 5 wt. % to about 15 wt. %, or alternatively from about 8 wt. % to about 12 wt. %, based upon the total weight of CAC.

In some embodiments, the CAC further comprises filler such as for example and without limitation ASTM Class F flyash. Without wishing to be limited by theory, the problems associated with premature gelation of a CAC may be exacerbated by the type and source of components present in commercially available CACs. For example, the composition of filler present in a commercially available CAC or added to a CAC may vary depending on the supplier of the filler. Likewise, variations in the composition of the filler (e.g. Class F flyash) may adversely affect the thickening time of a CAC. The amount of filler in the wellbore servicing composition may range from about 25 wt. % to about 150 wt. %, alternatively from about 50 wt. % to about 125 wt. %, or alternatively from about 75 wt. % to about 100 wt. %, based upon the total weight of CAC. CAC compositions comprising calcium aluminate, phosphate salts and filler are described in U.S. Pat. Nos. 5,900,053, 6,143,069 and 6,332,921 each of which are incorporated by reference herein in its entirety.

In an embodiment the wellbore servicing composition comprises a gelation inhibitor (GI). The GI may comprise a copolymer obtained by the copolymerization of at least one sulfonated monomer, at least one carboxylated monomer and at least one nonionic monomer. Alternatively, the GI may comprise a copolymer obtained by the copolymerization of at least two sulfonated monomers, at least one carboxylated monomers and at least one nonionic monomer.

The sulfonated monomers may be selected from sulfonated styrene, allyloxybenezenesulfonic acid, methallyl sulfonic acid, allyl sulfonic acid, 2-acrylamido-2-methyl-1-propanesulfonic acid, their alkali metal or ammonium salts, or combinations thereof. In an embodiment, the sulfonated monomer comprises allyloxybenzenesulfonic acid. In an embodiment, the GI comprises a copolymer produced from the polymerization of (a) at least one allyloxybenzenesulfonic acid monomer (Component A) having the general chemical formula (I), (I)

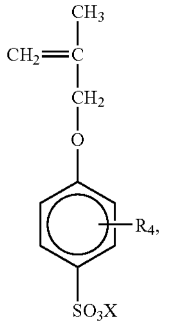

wherein $R_4$ is hydrogen or a $C_1$-$C_6$ alkyl; and X is hydrogen, an alkali or alkaline earth metal or ammonium; (b) at least one methallyl sulfonic acid monomer (Component B); (c) at least one copolymerizable nonionic monomer (Component C); and (d) at least one copolymerizable olefinically unsaturated carboxylic acid monomer (Component D).

As used herein, allyloxybenzenesulfonic acid (ABS) monomer is intended to include monomers selected from the group consisting of allyloxybenzenesulfonic acid and salts thereof or combinations thereof, as defined in chemical structure I. The allyloxybenzenesulfonate monomers, may be prepared by well-known processes illustrated, for example, by U.S. Pat. No. 3,426,104, incorporated by reference herein in its entirety. The allyloxybenzenesulfonate monomers found to be particularly useful herein are p-methallyloxybenzenesulfonic acid and salts thereof. The GI may comprise at least about 2.5 mole percent (mol %) of the allyloxybenzenesulfonic acid monomer, alternatively from about 2.5 to about 10 mol %, alternatively from about 3.5 to about 8 mol % and alternatively from about 3.5 to about 6 mol %.

As used herein, methallyl sulfonic acid (MS) monomer is intended to include monomers selected from the group consisting of methallyl sulfonic acid and the alkali or alkaline earth metal or ammonium salts thereof or combinations thereof. In an embodiment, the monomers comprise alkali metal salts of methallyl sulfonic acid such as for example the sodium or potassium salt of methallyl sulfonic acid. In an embodiment, the MS monomer comprises sodium methallyl sulfonate (SMS). The GI may comprise at least about 0.5 mol % of the methallyl sulfonic acid monomer, alternatively from about 0.5 to about 10 mol %, alternatively from about 2.5 to about 8 mol %, and alternatively from about 2.5 to about 6 mol %.

The ABS and MS monomers may be present in amounts effective to produce the required copolymer. Additionally, of the total amount of ABS and MS monomers used, the level of ABS used may be minimized to reduce the economic cost of preparation of the GI, as the ABS monomer is relatively expensive compared to the MS monomer. Accordingly, as much of the ABS monomer as is possible is replaced with the MS monomer. The ABS:MS molar ratio may range from about 11:1 to about 1:2, alternatively from about 3.5:2.5 to about 1:1.5.

As used herein, copolymerizable nonionic monomer is intended to include monomers represented by the general chemical structure II:

(II)

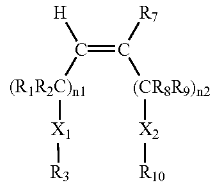

wherein $n_1$ and $n_2$ are independently 0 to 10; $R_1$, $R_2$, $R_8$ and $R_9$ are independently hydrogen, $C_1$-$C_6$ alkyl, or $C_1$-$C_6$ alkyl-substituted aryl; $R_7$ is hydrogen, $C_1$-$C_6$ alkyl, or $CO_2X$, where X is hydrogen, an alkali or alkaline earth metal or $C_1$-$C_6$ alkyl; $X_1$ and $X_2$ are absent or are independently O, C═O, or hydrogen; $R_3$ is absent or is C(═O)$R_4$, $OR_4$, $NR_5R_6$, $C_1$-$C_{18}$ alkyl or hydrogen where $R_4$ is $C_1$-$C_{18}$ alkyl or hydrogen and $R_5$ and $R_6$ are independently hydrogen, $C_1$-$C_6$ alkyl, or an alkyloxyether or alcohol; and $R_{10}$ is absent or is C(═O)$R_{11}$, $OR_{11}$, $NR_{12}$ $R_{13}$, $C_1$-$C_{18}$ alkyl, or hydrogen, where $R_{11}$ is $C_1$-$C_{18}$ alkyl or hydrogen, $R_{12}$ and $R_{13}$ are independently hydrogen, $C_1$ to $C_6$ alkyl, or an alkyloxyether or alcohol.

The coploymerizable nonionic monomer may be alternatively selected from the group consisting of $C_1$-$C_6$ alkyl esters of (meth)acrylic acid, acrylamide and the $C_1$-$C_6$ alkyl-substituted acrylamides, the N-alkyl-substituted acrylamides and the N-alkanol-substituted acyrylamides. Also useful are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid and valeric acid. Copolymerizable nonionic monomers may be selected from the group consisting of methyl(meth)acrylate, mono- and dimethyl maleate, mono- and di-ethyl itaconate, and (meth)allyl acetates, propionates and valerates. Alternatively, the copolymerizable nonionic monomer comprises methyl methacrylate. The GI may contain from about 10 to about 20 mol % of the copolymerizable nonionic monomer, alternatively from about 12 to about 18 mol %. Minor amounts of crosslinking monomers such as diallyl maleate, alkylene bisacrylamide and triallyl cyanurate may also be employed herein.

As used herein, a copolymerizable olefinically unsaturated carboxylic acid monomer is intended to include aliphatic, branched or cyclic, mono- or dicarboxylic acids, the alkali or alkaline earth metal or ammonium salts thereof, and the anhydrides thereof. Examples of suitable monocarboxylic acid monomers include without limitation acrylic acid, methacrylic acid and ethacrylic acid, and combinations thereof (the "acrylate" monomer). In an embodiment, the acrylate monomers useful in the production of the GI comprise olefinically unsaturated carboxylic acid monomer containing at least one activated carbon-to-carbon olefinic double bond, and at least one carboxyl group, that is, an acid containing an olefinic double bond which readily participates in polymerization because of its presence in the monomer molecule either in the alpha-beta position with respect to a carboxyl group, or as a part of a terminal methylene grouping. Useful olefinically unsaturated acids of this class include such widely divergent materials as the acrylic acid comonomers typified by acrylic acid itself, methacrylic acid, ethacrylic acid, alpha-chloro-acrylic acid, alpha-cyano acrylic acid, alpha-chloro-acrylic acid, alpha-cyano acrylic acid, beta-methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), or polycarboxylic acid monomers such as itaconic acid, maleic acid, citraconic acid, mesaconic acid, glutaconic acid, aconitic acid, fumaric acid, and tricarboxy ethylene. For the polycarboxylic acid monomers, an anhydride group may be formed by the elimination of one molecule of water from two carboxyl groups located on the same polycarboxylic acid molecule. In an embodiment, the GI comprises olefinically unsaturated carboxylic acid monomers such as monoolefinic acrylic acids having a substituent on the olefinic α-carbon selected from the class consisting of hydrogen, halogen and hydroxyl groups, monovalent alkyl radicals, monovalent aryl radicals, monovalent aralkyl radicals and monovalent cycloaliphatic radicals. As used herein, (meth)acrylic acid is intended to include acrylic acid and methacrylic acid. The GI may comprise at least about 60 mol % of the copolymerizable unsaturated carboxylic acid monomer, alternatively from about 60 to about 87 mol %, alternatively from about 70 to about 87 mol %, and alternatively from about 75 to about 85 mol %. In an embodiment, the copolymerizable unsaturated carboxylic acid monomers comprise acrylic and methacrylic acid, alternatively acrylic acid.

The weight average molecular weight of the polymers comprising the GI ranges widely, including polymers from about 1,000 to about 50,000 Daltons alternatively, from about 5,000 to about 20,000 Daltons. GIs of the type disclosed herein are described in U.S. Pat. Nos. 5,547,612, 5,698,512 and 7,087,189 each of which are incorporated by reference herein in its entirety. Examples of suitable GIs include without limitation AQUATREAT 540 and ALCOSPERSE 240 which are copolymers comprising sulfonated aromatic monomers, nonionic monomers and acrylate monomers which are commercially available from ALCO Chemical Company. The amount of GI in the wellbore servicing composition may range from about 0.05 wt. % to about 4 wt. %, alternatively from about 0.1 wt. % to about 2 wt. %, or alternatively from about 0.3 wt. % to about 1.5 wt,%, based upon the total weight of CAC. The GI may be used as a solid, as a solution in water or as a dispersion in a non-aqueous liquid.

In an embodiment, the wellbore servicing composition comprises a set modifier. Set modifiers are materials such as set retarders and set accelerators which function to alter the time required for the composition to undergo the phase transition from a fluid slurry to a set solid mass. Such materials may allow the operator to control the set time of the composition based on a variety of factors such as for example the wellbore temperature at which the wellbore servicing composition will be used. In an embodiment, a set modifier suitable for use with the CAC of this disclosure comprises organic acids such as citric and tartaric acids, polyvalent cation-containing compound or combinations thereof. The polyvalent cation-containing compound may function to increase the thickening time of the CAC and as such act as a set retarder. In an embodiment, the polyvalent cation-containing compound comprises a salt containing a polyvalent cationic metal. Such polyvalent cationic metal containing salts are known to one of ordinary skill in the art and include for example and without limitation alkaline earth metal salts such as magnesium chloride, calcium nitrate, calcium chloride; transition metal salts such as titanium (IV) sulfate, titanium (IV) tartarate, zirconium (IV) chloride, zirconium (IV) oxychloride, zirconium (IV) acetate, zirconium (IV) citrate, zirconium (IV) lactate, cobalt (II or III) chloride and, nickel (II) chloride; or combinations thereof. Examples of polyvalent metal salts suitable for use in this disclosure include without limitation calcium chloride which is widely commercially available, CL-23 crosslinker which is an aqueous zirconium salt solution commercially available from Halliburton Energy Services or combinations thereof. In an embodiment, the set modifier may be included in the wellbore servicing composition in amounts ranging from about 0.1 wt. % to about 10 wt. %, alternatively from about 0.3 wt. % to about 5.0 wt. %, alternatively from about 0.4 wt. % to about 2.0 wt. %, based on the weight of the calcium aluminate content of the CAC.

In an embodiment, the polyvalent cation-containing compound may be used in combination with at least one other set modifier. The set modifier may comprise conventional set accelerators and set retarders which may be combined with the polyvalent cation-containing compound to provide a desired set time for a CAC. Such compositions comprising at least one polyvalent cation-containing compound with conventional set retarders and/or accelerators are referred to herein as set modifier compositions (SMC). In an embodiment, a SMC comprises a monovalent cation-containing compound and a polyvalent cation-containing compound. In an embodiment, the monovalent cation-containing compound comprises a monovalent metal salt. Monovalent metal salts are well known set accelerators for both CACs and Portland cements. Examples of monovalent metal salts suitable for use in the SMC include without limitation alkali metal salts such as the soluble salts of sodium, potassium and lithium. In an alternative embodiment, the SMC comprises a polyvalent cation-containing compound and an organic acid. Organic acids may act as set retarders that function to delay gelation of the wellbore servicing composition. Various organic acids can be included in the SMC including, but not limited to, tartaric acid, citric acid, oxalic acid, gluconic acid, oleic acid, and uric acid. Examples of suitable organic acids are commercially available from Halliburton Energy Services, Inc., of Duncan, Okla., under the trade names HR®-25 and Fe-2®. The ratio of polyvalent cation-containing compound to monovalent cation-containing compound or polyvalent cation-containing compound to organic acid in the SMC will depend on factors such as the desired set time and operating temperature and may be determined by one of ordinary skill in the art to meet the needs of the user.

The set retarders disclosed herein are less effective and may have the opposite effect when used in combination with Portland cements (e.g., Class A, C, G and H cements), and thus the cementitious material preferably excludes such Portland cements.

The wellbore servicing composition may include a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The amount of water may depend on the desired density of the cement slurry and the desired slurry rheology and as such may be determined by one of ordinary skill in the art.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art. In some embodiments the compositions may be foamed using an inert gas such as nitrogen. Foamed cement compositions are described in U.S. Pat. Nos. 6,332,921; 5,900,053 and 6,143,069 each of which are incorporated by reference herein in its entirety.

The components of the wellbore servicing composition comprising a GI as described herein may be combined in any order desired by the user to form a slurry that may then be placed into a wellbore. The components of the wellbore servicing composition comprising a GI may be combined using any mixing device compatible with the composition, for example a bulk mixer or a recirculating mixer.

The wellbore servicing compositions comprising a GI as disclosed herein may be further characterized by a longer thickening time that allows the composition to remain pumpable without gelling during downhole placement before setting when compared to an otherwise identical composition lacking a GI. In an embodiment, the set time corresponds to the exothermic hydration of the calcium aluminate cement after which the strength development is faster than when the composition sets or becomes unpumpable due to gelation. The thickening time refers to the time required for the composition to achieve 70 Bearden units of Consistency (Bc). At about 70 Bc, the slurry undergoes a conversion from a pumpable fluid state to a non-pumpable paste. In an embodiment, the wellbore servicing composition comprising a GI may have a thickening time of greater than about 1 hour, alternatively greater than about 5 hours, alternatively greater than about 10 hours, alternatively greater than about 15 hours, alternatively greater than about 20 hours at temperatures of from about 50° F. to about 400° F., alternatively from about 120° F. to about 300° F., alternatively greater than about 200° F. In an embodiment, the wellbore servicing composition comprising a GI further comprises a set modifier, e.g., a SMC, of the type disclosed herein and in amounts sufficient to adjust the thickening time to a user desired value. Such adjustments may be made by one of ordinary skill in the art. The GI of this disclosure may serve as cost effective additives which may be used to adjust the thickening time and setting of a low alumina and/or high iron oxide CAC.

In an embodiment the wellbore servicing composition comprising a GI sets into a hard mass soon after setting, for example within about 10 to about 48 hrs after setting, with compressive strengths of from about 250 psi to about 20000 psi, alternatively from about 500 to about 5000, alternatively from about 1000 to about 3000 psi. Herein the compressive strength is defined as the capacity of a material to withstand axially directed pushing forces. The maximum resistance of a material to an axial force is determined in accordance with American Petroleum Institute (API) Recommended Practice 10B, 22$^{rd}$ Edition, December 1997. Beyond the limit of the compressive strength, the material becomes irreversibly deformed and no longer provides structural support and/or zonal isolation.

In an embodiment, a wellbore servicing composition comprises CAC, at least one GI, and at least one polymeric phosphate salt (e.g., polyphosphate salt) of the type disclosed herein. Alternatively, the wellbore servicing composition comprises CAC, at least one GI, at least one polymeric phosphate salt (e.g., polyphosphate salt) and at least one filler of the type disclosed herein. Alternatively, the wellbore servicing composition comprises CAC, at least one GI, at least one polymeric phosphate salt (e.g., polyphosphate salt) and at least one set modifier (e.g., SMC) of the type disclosed herein. Alternatively, the wellbore servicing composition comprises CAC, at least one GI, at least one polymeric phosphate salt (e.g., polyphosphate salt), at least one filler, and at least one set modifier (e.g., SMC) of the type disclosed herein. The amounts and type of the CAC, GI, polymeric phosphate salt (e.g., polyphosphate salt), filler, and/or SMC included in the wellbore servicing composition may be determined by one of ordinary skill in the art to adjust the thickening time to a user desired value.

The wellbore servicing compositions disclosed herein can be used for any purpose. In an embodiment, the wellbore servicing compositions disclosed herein are used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the wellbore servicing composition comprising a GI in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the wellbore servicing composition comprising a GI may viscosity in a loss-circulation zone and thereby restore circulation. The viscosified mixture can set into a flexible, resilient and tough material, which may prevent further fluid losses when circulation is resumed. The wellbore servicing composition comprising a GI may withstand substantial amounts of pressure, e.g., the hydrostatic pressure of a drilling fluid or cement slurry, without being dislodged or extruded. The wellbore servicing composition comprising a GI may provide a relatively viscous mass inside the loss-circulation zone. The wellbore servicing composition comprising a GI can also form a non-flowing, intact mass inside the loss-circulation zone. This mass plugs the zone and inhibits loss of subsequently pumped drilling fluid, which allows for further drilling. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the wellbore servicing compositions comprising a GI may be employed in well completion operations such as primary and secondary cementing operations. Said compositions may be placed into an annulus of the wellbore and allowed to set such that it isolates the subterranean formation from a different portion of the wellbore. The wellbore servicing compositions comprising a GI thus form a barrier that prevents fluids in that subterranean formation from migrating into other subterranean formations. Within the annulus, the fluid also serves to support a conduit, e.g., casing, in the wellbore.

In an embodiment, the wellbore in which the wellbore servicing compositions comprising a GI are positioned belongs to a multilateral wellbore configuration. It is to be understood that a multilateral wellbore configuration includes at least two principal wellbores connected by one or more ancillary wellbores. In secondary cementing, often referred to as squeeze cementing, the wellbore servicing composition comprising a GI may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described in U.S. Pat. Nos. 5,346,012 and 5,588,488, which are incorporated by reference herein in their entirety.

EXAMPLES

The invention having been generally described, the following examples are given as particular embodiments of the invention and to demonstrate the practice and advantages thereof. It is understood that the examples are given by way of illustration and are not intended to limit the specification.

Comparative Example 1

The effect of polyvalent metal salts on the thickening time of a low alumina calcium aluminate cement was investigated. A solid blend of 350 grams of Ciment Fondu and 350 grams of Class F flyash available as Pozmix A from Halliburton Energy Services were added to 285 grams of water containing 36.6 grams CL-23 crosslinker solution in a Waring blender and the slurry was prepared according to API Recommended Practice10B-2 (Formerly 10B), First Edition, July 2005. The thickening time was measured according to the API procedure at 200° F. at 8000 psi. The thickening time was measured as 42 minutes. By examining the thickening time chart it was determined that the viscosity increase at the thickening time was due to gelling and not due to cement hydration. When a cement slurry becomes a viscous paste due to hydration of the cement, considerable heat is liberated from the hydration reactions. The liberated heat of hydration results in a quick rise in the slurry temperature. The Consistometer used to measure the thickening time senses the temperature raise in the slurry and lowers the heat supply in order to cool the chamber to maintain the programmed slurry temperature of 200° F. resulting in a drop in the temperature of the chamber. Furthermore, the temperature traces for the slurry and the oil temperature in the chamber cross each repeatedly until ultimately the temperatures are identical. If at the thickening time, when the slurry becomes a paste suggesting unpumpability, the cement has not hydrated but only gelled, the criss-crossing of the slurry and the oil temperature in chamber is not observed. A more detailed description of the phenomenon is found in SPE paper 106006 titled "Designing Cement Slurries for Preventing Formation Fluid Influx After Placement" presented at the 2007 SPE International Symposium on Oilfield Chemistry held in Houston, 28 Feb.-2 Mar. 2007, incorporated by reference herein in its entirety. The results thus demonstrated that when polyvalent salts are used in combination with calcium aluminate cements having a low alumina content the slurries gelled very quickly long before the slurries were hydrated.

Example 1

The effect of polyphosphate salts on the thickening time of a low alumina calcium aluminate cement was investigated. The cure temperature, procedure and the amounts were identical to those described in Comparative Example with the exception that the solid blend contained 41.1 grams sodium hexametaphosphate and the mix water amount was adjusted to 299.5 grams to maintain the same density. The thickening time was extended and an examination of the thickening time chart did not suggest cement hydration. The results demonstrate that thickening times can be extended to some extent using polyphosphate salts, but the extension of the thickening time was inadequate to keep the slurry in fluid form for the typical duration of 3-6 hours required to place a slurry behind a casing.

Example 2

Cement slurries comprising a low alumina calcium aluminate cement were prepared and the effects of various gelation inhibitors on the thickening time of the slurries investigated. Nine additional cement slurries were prepared containing CIMENT FONDU cement, Class F Flyash, sodium hexametaphosphate, AQUATREAT 540 sulfonated copolymer, calcium chloride ($CaCl_2$), Fe-2 organic acid, CL-23 crosslinker, and water in the amounts indicated in Table 1. CIMENT FONDU is a calcium aluminate cement commercially available from LaFarge Aluminates, AQUATREAT 540 is a sulfonated copolymer commercially available from ALCO chemicals, Fe-2 is an organic acid and CL-23 crosslinker is an aqueous zirconium salt solution both of which are commercially available from Halliburton Energy Services. Class F Flyash 1 and Flyash 2 are both ASTM Class F flyash that differ only in the supplier. The density of the slurries was kept constant at 15.04 pounds per gallon. The slurries were cured at 200° F. and the thickening times of the slurries are presented in Table 1.

TABLE 1

| Material | Sample # | | | | | | | | | | |
|---|---|---|---|---|---|---|---|---|---|---|---|
| | Comparative Example 1 | 1 | 2 | 3 | 4 | 5 | 6 | 7 | 8 | 9 | 10 |
| CIMENT FONDU | 100 | 100 | 100 | 100 | 100 | 100 | 100 | 100 | 100 | 100 | 100 |
| Class F Flyash 1 | 100 | 100 | 100 | 100 | 100 | | | | | | |
| Class F Flyash 2 | | | | | | 100 | 100 | 100 | 100 | 100 | 100 |
| Sodium Hexametaphosphate % bwoc[1] | | 11.75 | 11.75 | | 11.75 | 11.75 | 11.75 | 11.75 | 11.75 | 11.75 | 11.75 |
| AQUATREAT 540 gal/sk[2] (% active bwoc) | | | 0.4 | 0.4 | 0.4 | 0.4 | 0.4 | 0.4 | 0.4 | 0.4 | 0.4 |
| $CaCl_2$ % bwoc | | | | | | | 1.0 | 1.0 | 1.0 | 1.0 | 1.0 |
| Fe-2 % bwoc | | | | | | | | | | | 1.0 |
| CL-23 crosslinker (% active Zr bwoc) | 1.0 | 1.0 | 1.0 | 1.0 | | 0.3 | 0.75 | | | | |
| Water (% active bwoc) | 81.4 | 85.6 | 83.0 | 78.8 | 87.8 | 84.6 | 90.1 | 90.1 | 90.1 | 81.4 | 89.8 |
| Thickening Time (hrs:min) | 0:42 Gelled | 1:46 gelled | >25 hrs | 0:16 gelled | 1:30 | 1:05 | 2:50 | 11:20 | 1:20 | 1:10 | 2:00 gelled |

[1]bwoc = by weight of cement
[2]gal/sk = gallons/sack of cement. Sack of cement is defined as 94 lbs Ciment Fondu per sack The results demonstrate that polyvalent salts such as calcium salts (e.g., $CaCl_2$) and zirconium salts (e.g., CL-23 crosslinker) can be used in combination with the GIs of this disclosure to adjust the thickening time of low alumina calcium aluminate cements.

Example 3

The effect of individual GI components on the thickening times of a low alumina calcium aluminate cement were investigated. Five cement slurries were prepared comprising CIMENT FONDU, Class F Flyash 2, sodium hexametaphosphate, $CaCl_2$, water and either AQUATREAT 540, ALCOSPERSE 240, ALCOSPERSE 747, ALCOSPERSE 149 or FDP 750 in the amounts indicated in Table 2. AQUATREAT 540, ALCOSPERSE 240 and ALCOSPERSE 747 are sulfonated copolymers while ALCOSPERSE 149 is sodium polyacrylate all of which are commercially available from ALCO Chemicals. FDP 750 is a sulfonated styrene polymer commercially available from Halliburton Energy Services. The slurries were cured at 200° F. and the thickening times measured and are presented in Table 2.

TABLE 2

| | Sample # | | | | |
|---|---|---|---|---|---|
| Material | 1 | 2 | 3 | 4 | 5 |
| CIMENT FONDU | 100 | 100 | 100 | 100 | 100 |
| Class F Flyash 2 | 100 | 100 | 100 | 100 | 100 |
| Sodium hexametaphosphate (% bwoc) | 11.75 | 11.75 | 11.75 | 11.75 | 11.75 |
| AQUATREAT 540 gal/sk (% active bwoc) | 0.4 | | | | |
| ALCOSPERSE 240 gal/sk (% active bwoc) | | | | | 0.4 |
| ALCOSPERSE 747 gal/sk (% active bwoc) | | | | 0.45 | |
| ALCOSPERSE 149 gal/sk (% active bwoc) | | | 0.45 | | |
| FDP 750 gal/sk (% active bwoc) | | 0.62 | | | |
| $CaCl_2$ % bwoc | 1.0 | 1.0 | 1.0 | 1.0 | 1.0 |
| Water % bwoc | 90.1 | 88.0 | 89.8 | 89.8 | 90.1 |
| Thickening Time (hrs:min) | 11:20 | 0:30 | 0:20 Gelled | 0:35 Gelled | 4:20 |

The results demonstrate that GIs comprising either sulfonated styrene polymers alone, (e.g., FDP 750) or acrylate polymers alone (e.g., ALCOSPERSE 149) did not prevent premature gelation of low alumina calcium aluminate cements. However, GIs comprising copolymers comprising both sulfonated aromatic monomers and acrylate monomers (e.g., AQUATREAT 540, ALCOSPERSE 240 or ALCOSPERSE 747) lengthened the thickening time of the slurry and prevented premature gelation.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising placing in the wellbore a composition comprising a calcium aluminate cement and at least one gelation inhibitor wherein the calcium aluminate cement is present in an amount of from about 30 wt. % to about 99 wt. % based upon the total weight of the solid composition; and allowing the composition to set.

2. The method of claim 1 wherein the calcium aluminate cement comprises less than about 50 wt. % alumina, greater than about 2 wt. % iron oxide, or both.

3. The method of claim 1 wherein the calcium aluminate cement has a $Al_2O_3/CaO$ ratio of from about 0.5:1 to about 5:1.

4. The method of claim 1 wherein the gelation inhibitor is present in the wellbore servicing composition in an amount of from about 0.05 wt. % to about 4.0 wt. % based on the total weight of the composition.

5. The method of claim 1 wherein the gelation inhibitor comprises a copolymer.

6. The method of claim 5 wherein the copolymer comprises least one sulfonated monomer, at least one carboxylated monomer, and at least one nonionic monomer.

7. The method of claim 5 wherein the copolymer comprises at least two sulfonated monomers, at least one carboxylated monomer, and at least one nonionic monomer.

8. The method of claim 5 wherein the copolymer comprises at least one allyloxybenzenesulfonic acid monomer having the general chemical structure (I), (I)

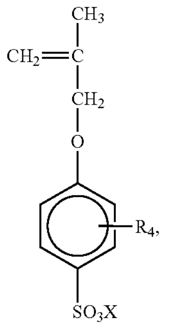

wherein $R_4$ is hydrogen or a $C_1$-$C_6$ alkyl; and X is hydrogen, an alkali or alkaline earth metal or ammonium; at least one methallyl sulfonic acid monomer; at least one copolymerizable nonionic monomer; and at least one copolymerizable olefinically unsaturated carboxylic acid monomer.

9. The method of claim 8 wherein the methallyl sulfonic acid monomer comprises methallyl sulfonic acid, alkali metal salts of methallyl sulfonic acid, alkaline earth metal salts of methallyl sulfonic acid, ammonium salts of methallyl sulfonic acid or combinations thereof.

10. The method of claim 8 wherein the copolymerizable nonionic monomer comprises monomers represented by the general chemical structure:

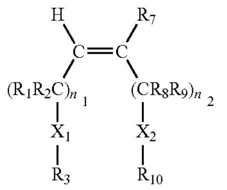

wherein $n_1$ and $n_2$ are independently 0 to 10; $R_1$, $R_2$, $R_8$ and $R_9$ are independently hydrogen, $C_1$-$C_6$ alkyl, or $C_1$-$C_6$ alkyl-substituted aryl; $R_7$ is hydrogen, $C_1$-$C_6$ alkyl, or $CO_2X$, where X is hydrogen, an alkali or alkaline earth metal or $C_1$-$C_6$ alkyl; $X_1$ and $X_2$ are absent or are independently O, C═O, or hydrogen; $R_3$ is absent or is C(═O)$R_4$, $OR_4$, $NR_5R_6$, $C_1$-$C_{18}$ alkyl or hydrogen where $R_4$ is $C_1$-$C_{18}$ alkyl or hydrogen and $R_5$ and $R_6$ are independently hydrogen, $C_1$-$C_6$ alkyl, or an alkyloxyether or alcohol; and $R_{10}$ is absent or is C(═O)$R_{11}$, $OR_{11}$, $NR_{12}R_{13}$, $C_1$-$C_{18}$ alkyl, or hydrogen, where $R_{11}$ is $C_1$-$C_{18}$ alkyl or hydrogen, $R_{12}$ and $R_{13}$ are independently hydrogen, $C_1$ to $C_6$ alkyl, or an alkyloxyether or alcohol.

11. The method of claim 8 wherein the copolymerizable nonionic monomer comprises $C_1$-$C_6$ alkyl esters of (meth) acrylic acid, the alkali or alkaline earth metal or ammonium salts thereof, acrylamide, $C_1$-$C_6$ alkyl-substituted acrylamides, N-alkyl-substituted acrylamides, N-alkanol-substituted acyrylamides, $C_1$-$C_6$ alkyl esters of unsaturated vinylic acids, $C_1$-$C_6$ alkyl half-esters of unsaturated vinylic acids, $C_1$-$C_6$ alkyl esters of saturated aliphatic monocarboxylic acids or combinations thereof.

12. The method of claim 8 wherein the copolymerizable olefinically unsaturated carboxylic acid monomer comprises aliphatic, branched or cyclic, mono- or dicarboxylic acids, alkali metal salts thereof alkaline earth metal salts thereof ammonium salts thereof; anhydrides thereof or combinations thereof.

13. The method of claim 5 wherein the copolymer has a molecular weight of from about 1,000 Daltons to about 50,000 Daltons.

14. The method of claim 1 further comprising a polymeric phosphate salt.

15. The method of claim 14 wherein the polymeric phosphate salt comprises sodium hexametaphosphate.

16. The method of claim 1 wherein the weilbore servicing composition further comprises a filler.

17. The method of claim 16 wherein the filler comprises Class F flyash.

18. The method of claim 1 further comprising a set modifier.

19. The method of claim 18 wherein the set modifier comprises a polyvalent cation-containing compound comprising a polyvalent metal salt.

20. The method of claim 19 wherein the polyvalent metal salt comprises an alkaline earth metal salt, a transition metal salt or combinations thereof.

21. The method of claim 20 wherein the alkaline earth metal salt comprises calcium chloride, magnesium chloride, calcium nitrate or combinations thereof.

22. The method of claim 20 wherein the transition metal salt comprises zirconium.

23. The method of claim 1 wherein the composition further comprises a monovalent metal salt, an organic acid or combinations thereof.

24. The method of claim 23 wherein the monovalent metal salt comprises the soluble salts of sodium, lithium, potassium or combinations thereof.

25. The method of claim 23 wherein the organic acid comprises citric acid, tartaric acid, oxalic acid, gluconic acid, oleic acid, phosphoric acid, uric acid or combinations thereof.

26. The method of claim 1 wherein the wellbore servicing composition has a thickening time of greater than about 1 hour.

27. A method of servicing a wellbore comprising adjusting the thickening time of calcium aluminate cement by contacting the cement with a salt and a gelation inhibitor, wherein the gelation inhibitor comprises a copolymer comprising one or more sulfonated aromatic monomers and one or more acrylate monomers and wherein the calcium aluminate cement is present in an amount of from about 30 wt. % to about 99 wt. % based upon the total weight of the solid composition;

placing the cement in the wellbore; and allowing the cement to set.

28. The method of claim 27 wherein the salt comprises a polymeric phosphate salt.

29. A method of servicing a welibore comprising preventing premature gelation of calcium aluminate cement by contacting the calcium aluminate cement with a gelation inhibitor comprising a copolymer, wherein the copolymer comprises alkylbenzene sulfonic acid, at least one methallyl sulfonic acid monomer, at least one copolymerizable nonionic monomer, and at least one copolymerizable olefinically unsaturated carboxylic acid monomer and wherein the calcium aluminate cement is present in an amount of from about 30 wt. % to about 99 wt. % based upon the total weight of the solid composition;

placing the cement in the welibore; and allowing the cement to set.

* * * * *